United States Patent Office 3,576,644
Patented Apr. 27, 1971

3,576,644
DRY ALCOHOLIC BEVERAGE FORMING COMPOUND
John E. Anderson, Clyde E. Parish, and George H. Ross, Houston, Tex., assignors to Signal Chemical Company
No Drawing. Original application Dec. 20, 1965, Ser. No. 515,194, now Patent No. 3,445,497, dated May 20, 1969. Divided and this application Jan. 27, 1969, Ser. No. 807,156
Int. Cl. C12g 3/00
U.S. Cl. 99—30
2 Claims

ABSTRACT OF THE DISCLOSURE

A dry alcoholic beverage forming composition is contained within a liquid permeable enclosure. The composition comprises a dry particulate alkyl carbonate of calcium and a water dispersible acidic flavoring agent.

This application is a division of copending application Ser. No. 515,194, filed Dec. 20, 1965 which issued as U.S. Pat. No. 3,445,497 on May 20, 1969.

The present invention generally relates to organic compounds and to improved methods of preparing the same, and, more particularly, relates to metal alkyl compounds, specifically metal alkyl carbonates, compositions prepared from the same, and compositions containing the same.

Various types of metal alkyl compounds are known and have established uses in industry. For example, the metal alkyl carbonate, sodium methyl carbonate, which has the formula $CH_3OCOONa$, is a useful organic intermediate for various synthesis reactions.

The principal object of the present invention is to prepare metal alkyl compounds, specifically metal alkyl carbonates and products thereof, i.e. improved compositions containing metal alkyl carbonates.

It is another object of the present invention to provide new compositions and methods of preparing the same, said compositions incorporating metal alkyl carbonates.

The foregoing and other objects are accomplished, in accordance with the present invention, by reacting intermediates prepared in accordance with the methods set forth in copending U.S. patent application, Ser. No. 372,409 entitled "Organic Compounds and Method of Preparing the Same" filed June 3, 1964, now abandoned, and its continuation-in-part application Ser. No. 592,749, filed Nov. 8, 1966 and issued Mar. 24, 1970 as U.S. Pat. No. 3,502,706 of which the inventors are the same as for the present application, and so also is the assignee, with selected reagents to derive the desired metal alkyl carbonate-containing products.

As a specific example for preparing the metal alkyl carbonates useful in the present invention, trimethyl amine is dissolved in absolute methanol and the resulting mixture is then contacted with carbon dioxide gas by bubbling the gas therethrough for a period of about one-half hour at about 50° C. at atmospheric pressure until carbon dioxide is no longer absorbed. Trimethyl ammonium methyl carbonate is found to be present in a substantial concentration in the solution. This compound is believed to have the structural formula

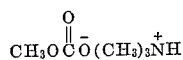

The trimethyl ammonium methyl carbonate is then converted into sodium methyl carbonate by treating the trimethyl ammonium methyl carbonate-containing methanol solution with a suitable concentration of methanol-soluble sodium hydrosulfide, NaSH. After this treatment, sodium methyl carbonate precipitates from the methanol solution of trimethyl ammonium hydrosulfide and is obtained in purified condition by filtration. The solution is then refluxed to decompose the trimethyl ammonium hydrosulfide to trimethyl amine and hydrogen sulfide, the latter passing from the solution as a gas.

Thus, an intermediate or adduct, which is formed at low temperature from a selected tertiary amine, a selected alkanol and carbon dioxide, can be reacted with a suitable metallic salt soluble or dispersible in the alkanol or in a mutual solvent to provide the desired methyl alkyl carbonate.

The metal alkyl carbonates formed in accordance herewith are useful for a variety of purposes in addition to those heretofore specified. For example, those compounds which contain metals which are catalytic in action can be used as carriers for such metals. Decomposition of certain of those compounds, for example by reaction with water in the case of selected metal alkyl carbonates, results in the release of inorganic salts bearing the catalytic metals for deposition, etc.

Moreover, calcium ethyl carbonate and sodium ethyl carbonate prepared by the present method have special further utility. Thus, their use in mixtures with other constituents forms a part of this invention. In this regard, calcium ethyl carbonate has the structural formula $[C_2H_5OCOO]_2Ca$ and can be prepared as previously described. Such product can be provided in powder form which breaks down upon contact with water to form ethyl alcohol and calcium carbonate and to release carbon dioxide as gas bubbles. This reaction can be characterized as follows:

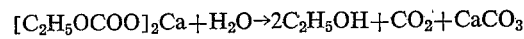

Metal alkyl carbonates in dry powder form prepared by the present method, which readily decompose and release bactericidal or sterilizing alcohols upon contact with water can be used in dry medicinal formulations, for example, calcium ethyl carbonate, sodium ethyl carbonate, sodium methyl carbonate, sodium isopropyl carbonate, sodium propyl carbonate, calcium methyl carbonate, calcium propyl carbonate and calcium isopropyl carbonate.

Dry powder forms of metal alkyl carbonates which readily release ethyl alcohol upon contact with water can also be used, in accordance with the invention, as sources of ethyl alcohol for alcoholic beverages and the like. Such dry powder forms of metal alkyl carbonates, the decomposition products of which are ethyl alcohol and harmless materials, such as calcium carbonate, sodium bicarbonate, carbon dioxide and the like, include calcium ethyl carbonate, sodium ethyl carbonate, potassium ethyl carbonate, magnesium ethyl carbonate, and the like.

As an example, if dry calcium ethyl carbonate powder is mixed with a dry flavoring agent, such as artificial orange flavored powder, and then the mixture is added to water, the result is that ethyl alcohol and carbon dioxide bubbles are released and calcium carbonate harmlessly precipitates out. The orange flavoring dissolves, and the ethyl alcohol and orange flavoring cooperate with the carbon dioxide bubbles to form a refreshing effervescent alcoholic beverage. The calcium carbonate can be isolated from the beverage by disposing the dry mixture in a water permeable bag, such as a tea bag, and then dunking it in water. All products except calcium carbonate permeate the tea bag and pass into the water outside the tea bag. Thus, a liquid alcoholic beverage can be prepared instantly from the premixed dry powder formulation which optionally contains one or more flavoring agents, etc. The calcium carbonate is harmless and, in fact, is somewhat beneficial if imbibed, inasmuch as it is, in precipitated form, a mild known antacid.

Similarly, the dry powder sodium ethyl carbonate yields ethyl alcohol and sodium bicarbonate upon contact with water, as per the following:

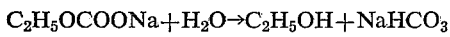

Thus, powdered sodium ethyl carbonate can be mixed with a suitable flavoring agent to provide a non-effervescent alcoholic beverage-forming powder. The sodium bicarbonate produced by reaction of sodium ethyl carbonate is an effective antacid which tends to alleviate any indigestion or other gastric upset which is frequently encountered during consumption of appreciable quantities of alcohol. Accordingly, sodium ethyl carbonate is a particularly desirable and effective compound utilizable both as a source of antiseptic and medicinal use and as the base material or essential ingredient in a dry, solid alcoholic beverage-forming composition. Potassium ethyl carbonate could be used in place of sodium ethyl carbonate to produce somewhat comparable results, the by-product potassium bicarbonate being baking soda.

The following specific examples further illustrate the use of selected ethyl alcohol-releasing carbonates in dry powder formulations of alcoholic beverages:

EXAMPLE I

Sodium ethyl carbonate, prepared as previously described in accordance with the present method and in the pure dry powdered form, is mixed with a commercially available synthetic orange juice-forming dry powder mixture known as Tang and comprising sugar, citric acid, gum arabic, natural orange flavor, sodium carboxymethylcellulose, calcium phosphate, sodium citrate, Vitamin C, hydrogenated vegetable oil, Vitamin A, artificial color, and a preservative. The sodium ethyl carbonate is uniformly mixed in the proportion of about 35 gm. with 15 gm. of the synthetic orange powder, and each 50 gm. portion of the resulting uniform mixture is placed in a tablet-forming die and is pressed into tablet form, after which the resulting tablet is moisture sealed in aluminum foil and stored.

Subsequently, the sealed tablet is unwrapped and is dropped into a highball glass containing ice cubes and cold water. The sodium ethyl carbonate instantly reacts with the water to form ethyl alcohol and sodium bicarbonate, both of which mix with the synthetic orange ingredients and are uniformly dispersed therewith in the water. This beverage approximates in appearance, taste and odor a commercially available drink known as a "screwdriver" and comprising orange juice and an ethyl alcohol-containing liquor, either vodka or gin. The orange flavor effectively masks the characteristic ethyl alcohol flavor of the beverage. Accordingly, the dry powder beverage composition is effective, economical and highly potable.

EXAMPLE II

A dry powder mixture of the commercially available synthetic orange powder of Example I, in 15 gm. amount and calcium ethyl carbonate in 40 gm. amount is added to a water permeable cellulosic bag of the type characterisically used to contain tea. The bag is then dunked into a 6 oz. glass of cold water, whereupon the calcium ethyl carbonate is converted to ethyl alcohol, carbon dioxide and water-insoluble calcium carbonate. Most of the calcium carbonate remains in the bag while the carbon dioxide in bubble form, the ethyl alcohol and synthetic orange penetrate the bag and pass into the water exterior of the bag. The bag is then removed from the glass and the effervescent alcoholic beverage is ready to serve. Additional effervescence can be obtained by including substantial amounts of acids in the described dry powder ingredients. Thus, for example, citric acid reacts with calcium carbonate to produce calcium citrate and carbon dioxide. Some critic acid is present in the synthetic orange formulation and this reacts with calcium carbonate, as described.

Other dry flavoring agents, capable of being readily dispersed or dissolved in water during release of the ethyl alcohol and carbon dioxide and metal carbonate or metal bicarbonate from the methyl ethyl carbonate, include conventional agents which can be provided to approximate the flavor and/or appearance and/or odor of various types of traditional liquors and/or liquor-containing drinks. For example, juniper berry oil in small amount, adsorbed on a suitable powder base, such as calcium carbonate, synthetic dry powdered grapefruit flavored beverage, etc.

The above examples illustrate new dry solid alcohol-releasing mixtures for medicinal and/or alcoholic beverage use. It will be obvious that in the case of beverages there are substantial advantages in having ethyl alcohol (and carbon dioxide if effervescence is desired) in a single dry compound and readily releasable therefrom in water along with selected antacids and the like. Thus, the dry constituents for an alcoholic beverage can be readily exactly measured and premixed. Expensive storage and transportation of liquors, flavors, etc. are also avoided. Moreover, the ease with which the beverage can be prepared is substantially increased. Furthermore, the dry alcohol-releasing medicinals of the invention are particularly advantageous for use under field or military conditions, etc. Further advantages of the compositions and methods described are set forth in the foregoing.

Various modifications, changes, alterations and substitutions can be made in the present methods and compositions. All such modifications, changes, alterations and substitutions as are within the scope of the appended claim form a part of the present invention.

What is claimed is:

1. A dry particulate metal alkyl compound containing composition, provided in a liquid permeable enclosure which is substantially impermeable to calcium carbonate, comprising (a) a dry particulate alkyl carbonate of calcium, capable of decomposing upon contact with water at room temperature, to release an alkanol and a non-toxic calcium carbonate compound, said alkyl having from 1 to 3 carbon atoms per molecule, and (b) a water dispersible citric acid containing flavoring agent in a concentration sufficient to mask the taste of said alkanol.

2. The composition of claim 1 wherein said calcium alkyl carbonate is calcium ethyl carbonate.

References Cited

UNITED STATES PATENTS

| 2,537,453 | 1/1951 | Frangialli | 99—78 |
| 3,259,502 | 7/1966 | Ehrlich et al. | 99—78X |

OTHER REFERENCES

Faurholt et al.: Chem. Abstracts, vol. 40, p. 513.
Kurov: Chem. Abstracts, vol. 46, p. 4485.

MORRIS O. WOLK, Primary Examiner

S. B. DAVIS, Assistant Examiner

U.S. Cl. X.R.

99—78, 79